United States Patent
Muthiah et al.

(10) Patent No.: US 11,403,163 B2
(45) Date of Patent: Aug. 2, 2022

(54) STORAGE SYSTEM AND METHOD FOR CRASH ANALYSIS

(71) Applicant: Western Digital Technologies, Inc., San Jose, CA (US)

(72) Inventors: Ramanathan Muthiah, Karnataka (IN); Abhishek Shetty, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/893,011

(22) Filed: Jun. 4, 2020

(65) Prior Publication Data
US 2021/0382780 A1 Dec. 9, 2021

(51) Int. Cl.
| G06F 11/00 | (2006.01) |
| G06F 11/07 | (2006.01) |
| G06F 13/16 | (2006.01) |
| G06F 11/16 | (2006.01) |
| G06F 11/30 | (2006.01) |
| G06F 11/10 | (2006.01) |

(52) U.S. Cl.
CPC ...... *G06F 11/0787* (2013.01); *G06F 11/0757* (2013.01); *G06F 11/0772* (2013.01); *G06F 11/1068* (2013.01); *G06F 11/1658* (2013.01); *G06F 11/3034* (2013.01); *G06F 13/1673* (2013.01)

(58) Field of Classification Search
CPC ............. G06F 11/3476; G06F 11/0778; G06F 11/0787; G06F 11/0766; G06F 11/0784; G06F 11/2046; G06F 11/3636; G06F 11/0772
See application file for complete search history.

(56) References Cited

U.S. PATENT DOCUMENTS

| 9,563,382 B2 | 2/2017 | Hahn et al. | |
| 9,760,480 B1* | 9/2017 | McKelvie | G06F 11/1471 |
| 2008/0201616 A1* | 8/2008 | Ashmore | G06F 11/0778 714/57 |
| 2015/0220413 A1* | 8/2015 | Hindi | G06F 11/2069 714/6.23 |
| 2015/0347265 A1* | 12/2015 | Clements | G06F 11/0778 714/45 |
| 2016/0246726 A1 | 8/2016 | Hahn | |
| 2017/0116096 A1* | 4/2017 | Keremane | G06F 11/006 |
| 2017/0242606 A1 | 8/2017 | Vlaiko et al. | |
| 2017/0285940 A1 | 10/2017 | Benisty et al. | |
| 2020/0133911 A1 | 4/2020 | Rao et al. | |

OTHER PUBLICATIONS

International Search Report completed May 12, 2021 for International Application No. PCT/US2021/016201.
Written Opinion completed May 12, 2021 for International Application No. PCT/US2021/016201.
Israel Patent Office Search Strategy completed May 4, 2021 for International Application No. PCT/US2021/016201.

* cited by examiner

*Primary Examiner* — Charles Ehne
(74) *Attorney, Agent, or Firm* — Crowell & Moring LLP (57) ABSTRACT

A storage system and method for crash analysis are provided. In one embodiment, a storage system comprises a memory and a controller. The controller is configured to store a crash log in a buffer in the controller; determine whether the storage system has crashed; and in response to determining that the storage system has crashed, send the crash log from the buffer in the controller to a host in communication with the storage system. Other embodiments are provided.

20 Claims, 8 Drawing Sheets

STORAGE SYSTEM AND METHOD FOR CRASH ANALYSIS

BACKGROUND

A storage system can contain a controller and a non-volatile memory for storing user data, such as documents, images, videos, and music. The controller can store diagnostic logs in the memory for later analysis if the storage system crashes or fails.

DETAILED DESCRIPTION

Overview

By way of introduction, the below embodiments relate to a storage system and method for crash analysis. In one embodiment, a storage system is provided comprising a memory and a controller. The controller is configured to store a crash log in a buffer in the controller; determine whether the storage system has crashed; and in response to determining that the storage system has crashed, send the crash log from the buffer in the controller to a host in communication with the storage system.

In some embodiments, the crash log is sent to the host for storage in a host memory buffer in the host.

In some embodiments, the storage system further comprises a host data path configured to route data between the memory and the host, and wherein the crash log is sent from the buffer in the controller to the host outside of the host data path.

In some embodiments, the host data path comprises one or more of the following components: an error correction code module, a memory interface module, and a host interface module.

In some embodiments, the crash log comprises a pre-determined data structure known to the host and the storage system.

In some embodiments, the pre-determined data structure is communicated between the host and the storage system during initialization of the storage system.

In some embodiments, a watchdog module in the controller is configured to send the crash log from the buffer in the controller to the host in response to determining that the storage system has crashed.

In some embodiments, the memory comprises a three-dimensional memory.

In another embodiment, a method is provided that is performed in a first storage system in communication with a second storage system. The method comprises: storing diagnostic data in a controller memory buffer in the first storage system; and in response to determining that the first storage system has failed, sending the diagnostic data from the controller memory buffer in the first storage system to a second storage system in communication with the first storage system.

In some embodiments, the diagnostic data is sent to the second storage device for storage in a controller memory buffer in the second storage system.

In some embodiments, the first storage system comprises a host data path configured to route data to and from the memory, and wherein the diagnostic data is sent from the controller memory buffer in the first storage system to the second storage system outside of the host data path.

In some embodiments, the host data path comprises one or more of the following components: an error correction code module, a memory interface module, and a host interface module.

In some embodiments, the diagnostic data comprises a pre-determined data structure known to first and second storage systems.

In some embodiments, a watchdog module in the controller in the first storage system is configured to send the diagnostic data from the controller memory buffer to the second storage system in response to determining that the first storage system has failed.

In some embodiments, the diagnostic data is sent from the controller memory buffer in the first storage system to the second storage system via a direct memory access operation.

In another embodiment, a storage system is provided comprising: a memory; means for storing a crash log in a controller memory buffer in the storage system; and means for, in response to determining that the storage system has crashed, sending the crash log from the controller memory buffer to an external device for analysis.

In some embodiments, the external device comprises a host.

In some embodiments, the external device comprises a second storage system.

In some embodiments, the crash log is sent from the controller memory buffer to the external device outside of a host data path to the memory.

In some embodiments, the crash log comprises a pre-determined data structure known to the host and the external device.

Other embodiments are possible, and each of the embodiments can be used alone or together in combination. Accordingly, various embodiments will now be described with reference to the attached drawings.

EMBODIMENTS

Figures 1A, 1B:
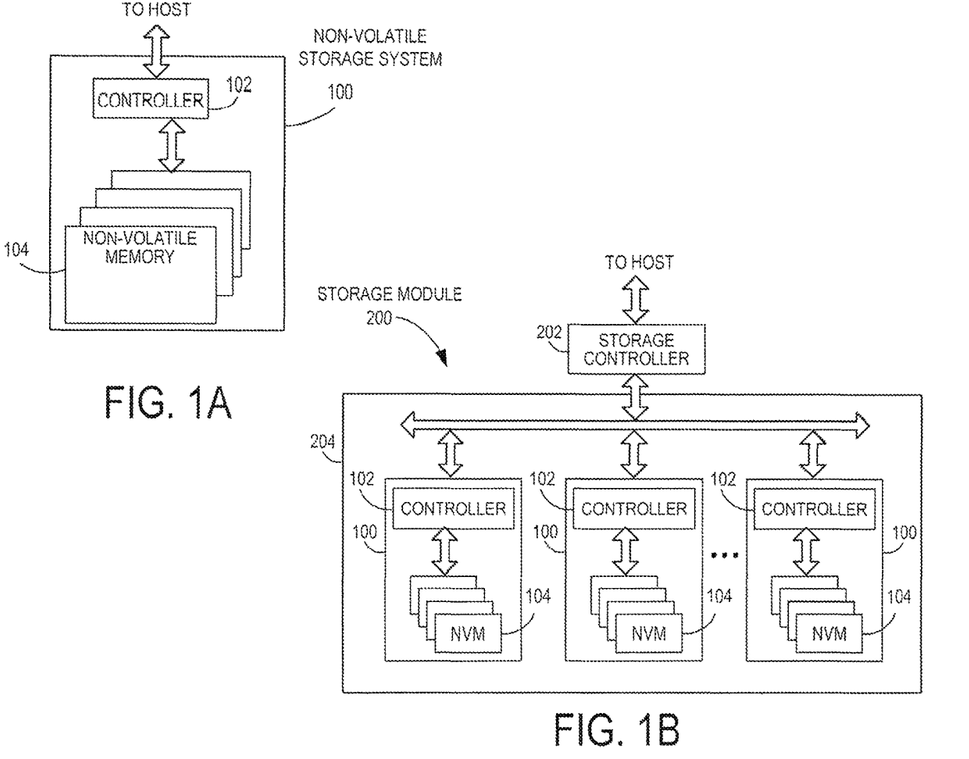
FIG. 1A is a block diagram of a non-volatile storage system of an embodiment.
FIG. 1B is a block diagram illustrating a storage module of an embodiment.
Figure 1C:
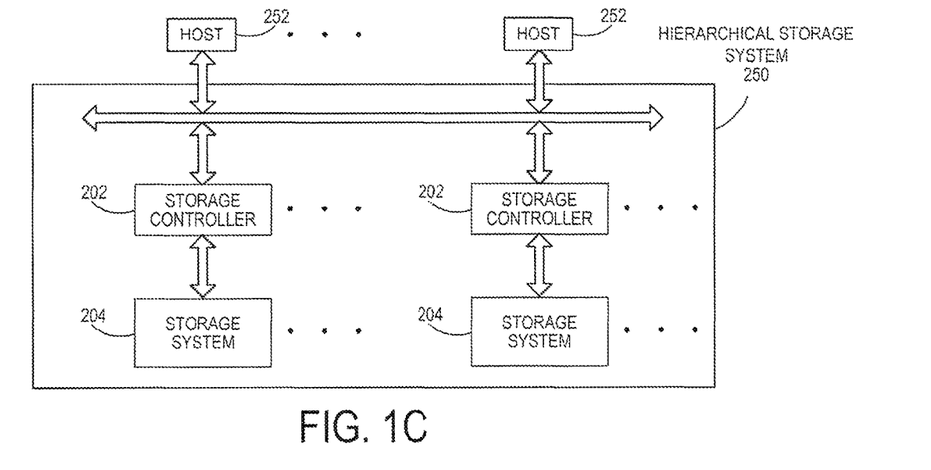
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
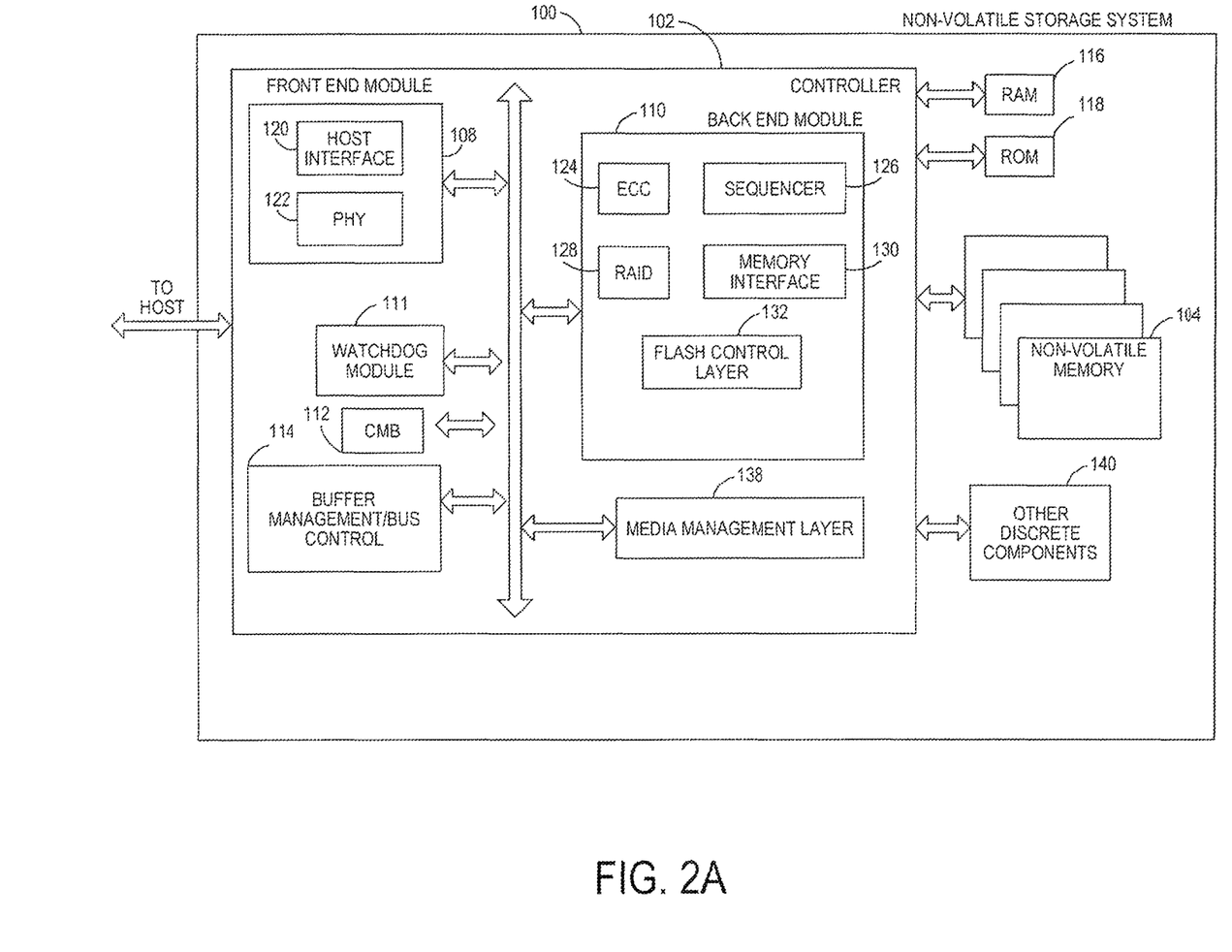
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. For example, as will be discussed below, in one embodiment, the controller 102 comprises a watchdog module 111, which can be implemented in hardware and/or software/firmware, that can be used in crash/debug/diagnostic analysis in conjunction with a controller memory buffer (CMB) 112 or other form of memory in the controller 102. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
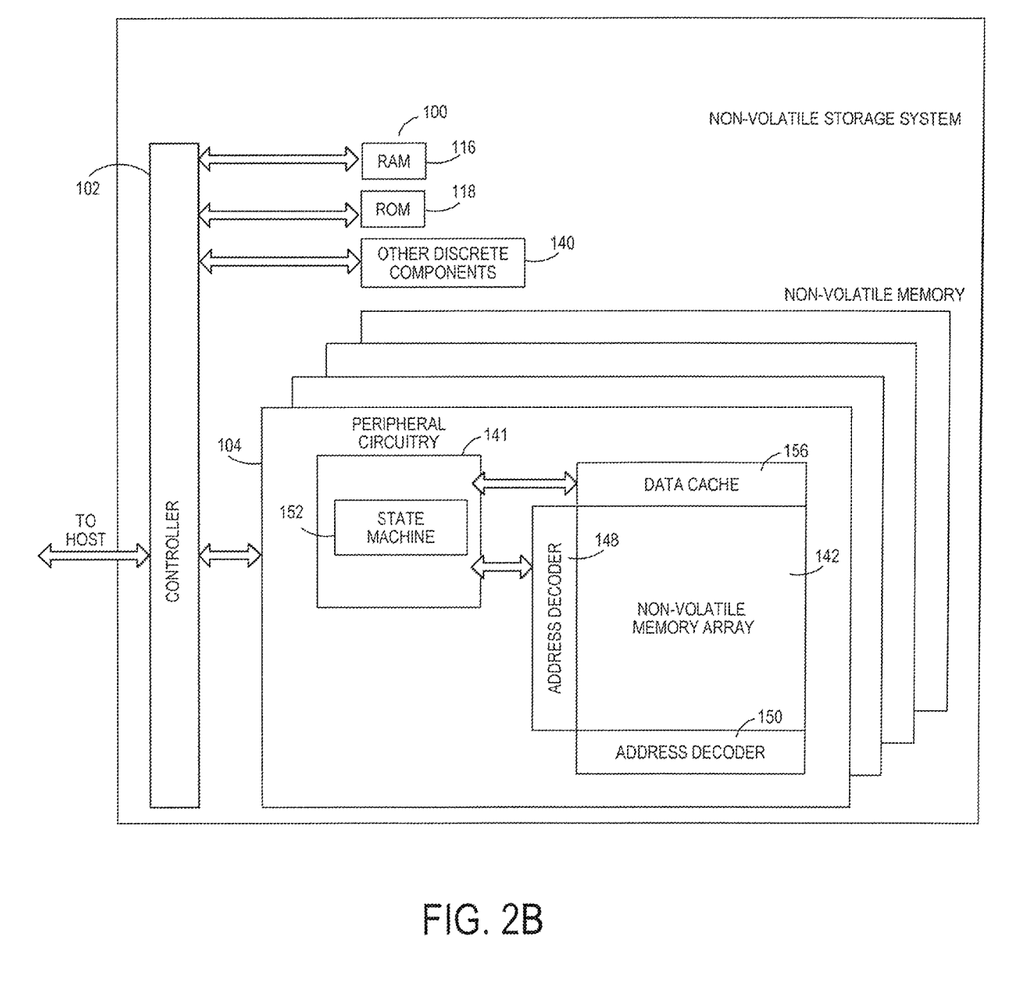
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
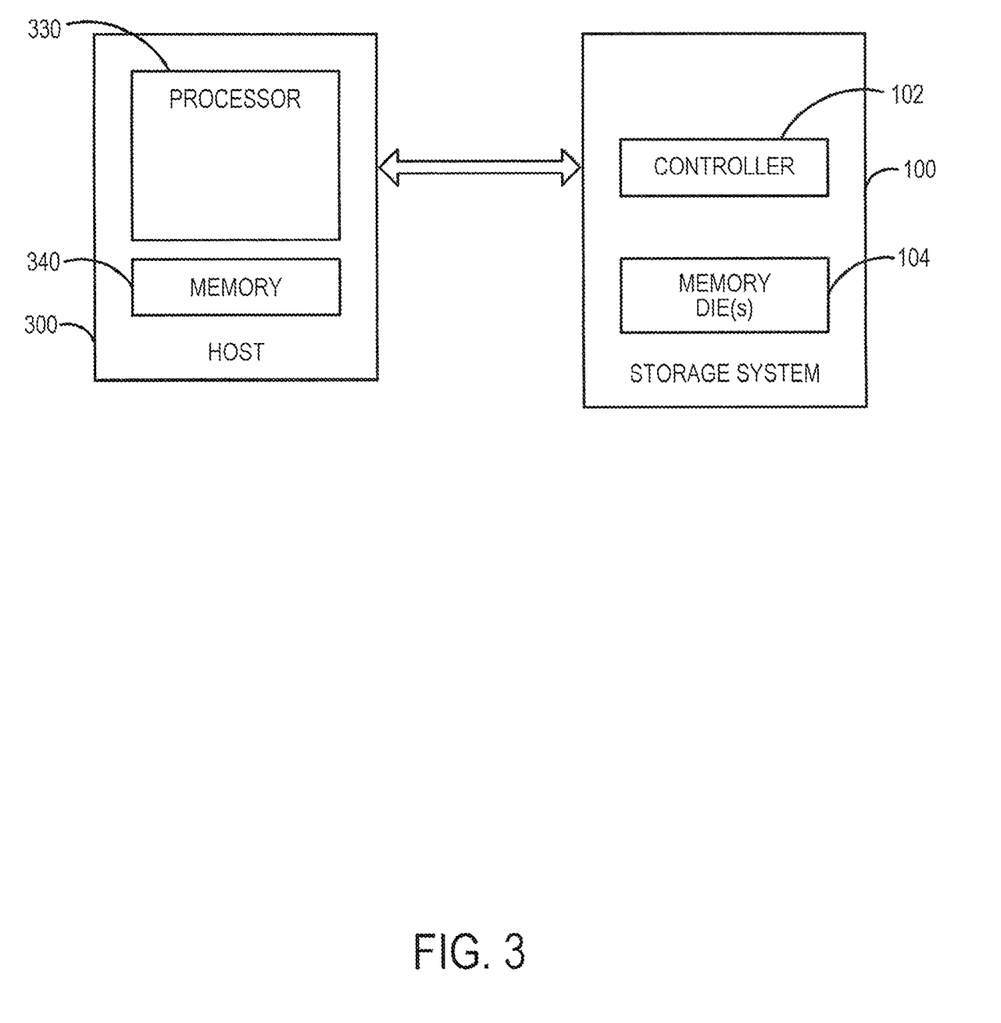
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to read data from and write data to the storage system 100, as well as perform error analysis on crash logs from the storage system 100.

As mentioned above, a controller of a storage system can store a crash log in the same non-volatile memory that is used for storing user data, such as documents, images, videos, and music. A crash log can contain diagnostic information that can assist in the debugging process to analyze why the storage system crashed (e.g., to determine the root cause of what caused the bug). Examples of diagnostic information can include, but are not limited to, information about the state of the storage system, the call stack, log data, firmware state machine information, and memory status.

In theory, the crash log can be analyzed by a host or other device if the storage system crashes/fails to determine the cause of the problem and potentially fix it to avoid future crashes. Since the crash log is stored in the non-volatile memory, the host or other device would need to access the memory. Reading the crash logs from the memory can be a tedious or impossible task because a crash typically means that the firmware in the storage system will not respond to host commands. In such a situation, memory access is typically not available until the storage system is reinitialized. Unfortunately, reinitializing the storage system can result in the loss of state machine and register values, which would hinder the ability to fully analyze the error and diagnostic data in the logs. So, a crash can result in a fatal system error and make the storage system non-responsive during that run or power cycle.

The following embodiments can be used to address this issue. In one embodiment, the storage system (sometimes referred to herein as "the device") 100 stores the crash log in a memory in the controller 102 (e.g., the controller memory buffer (CMB) 112), and the controller 102 has a watchdog module 111 that sends the crash log from the CMB 112 to an external device (e.g., the host 300 or another storage system) for analysis. Because the crash logs are not stored in the memory 104, the inability of the host 300 or other device to access the memory 104 does not prevent accessing the crash logs. Also, as other modules (e.g., an error correction code module, a memory interface module, and a host interface module) in the host data path to and from the memory 104 may not be functional after the crash, the watchdog module 111 can send the crash logs to the external device outside of the host data path.

The following paragraphs provide example implementations of embodiments. It should be understood that these are merely examples, and other implementations are possible.

Figure 4:
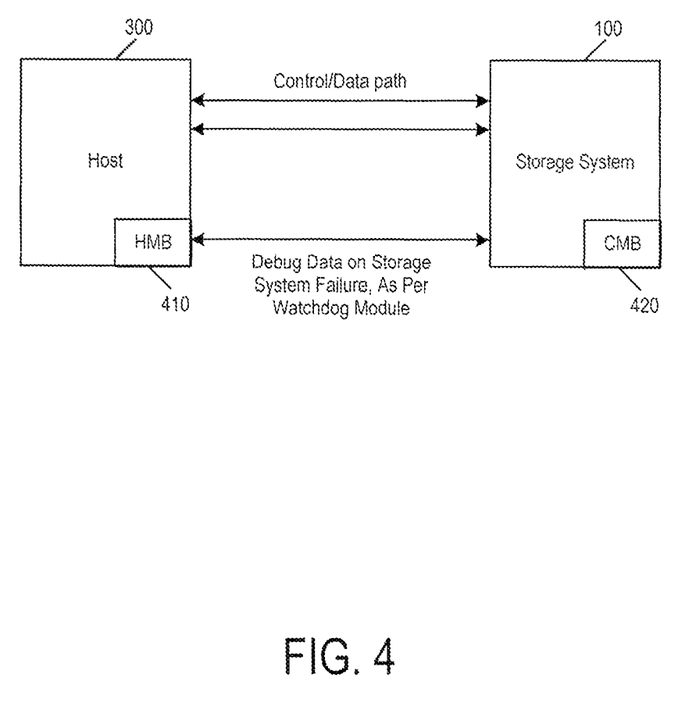
FIG. 4 is a block diagram of a host and storage system of an embodiment that can be used for crash analysis.

Turning again to the drawings, FIG. 4 is a block diagram that illustrates an embodiment in which the storage system 100 stores the crash log in a controller memory buffer (CMB) 420, and a watchdog module in the storage system 100 sends debug data from the crash log to the host 300 (in a channel other than the standard control/data path) after a crash is detected. In this embodiment, the host 300 stores the crash log in a host memory buffer (HMB) 410, which is memory that is designated for used by the storage system 100 in the NVMe specification. So, the controller 102 of the storage system 100 can issue read and write commands to the HMB 410 as if it were its own memory (with potentially some restrictions). Because the HMB 410 is outside of the failing device and is an existing interface in the NVMe specification, the HMB 410 can be used to remove the dependency on the failing device for diagnostic data. It should be noted HMBs and CMBs have been used in prior storage system as a "luxury" to improve performance. However, in one embodiment, the use of these components would be more than just a "luxury," as they would store data that would otherwise be difficult or impossible to access from the memory 104.

Figure 6:
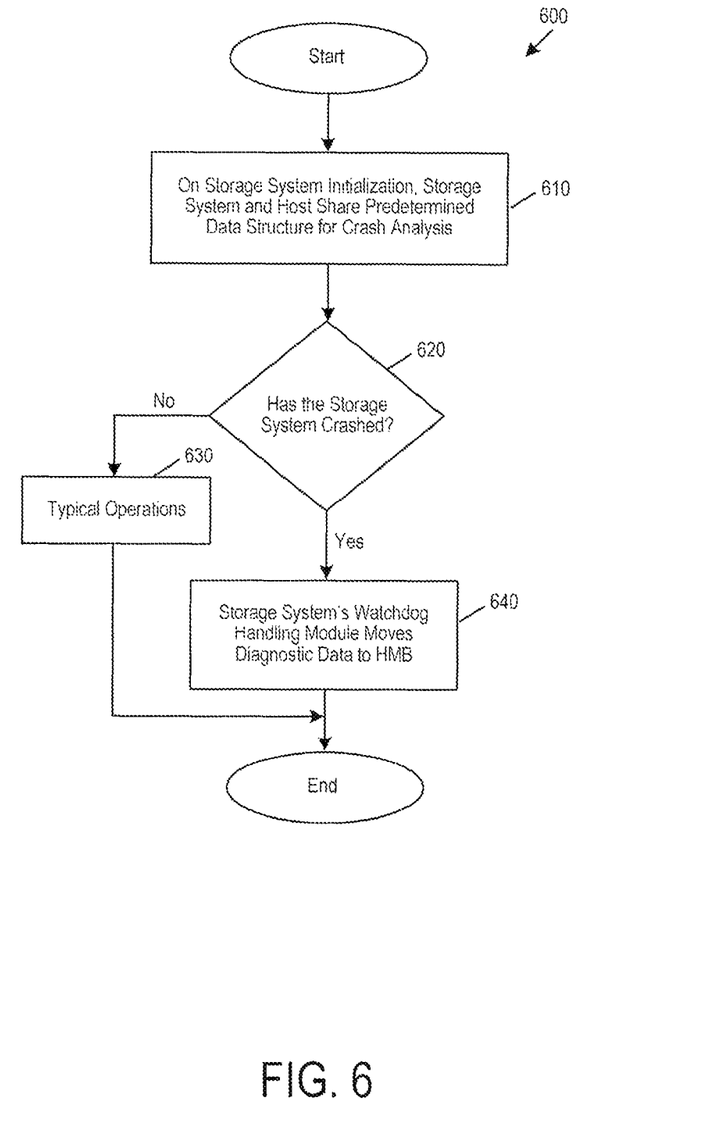
FIG. 6 is a flow chart of a method performed by a storage system of an embodiment for crash analysis.

FIG. 6 is a flow chart 600 that illustrates the operation of this embodiment. As shown in FIG. 6, upon initialization of the storage system 100 (or at some time prior to a crash), the storage system 100 and the host 300 share a predetermined data structure for crash analysis (act 610). During operation of the storage system 100, the controller 102 can log all data required to evaluate the reason for the crash into the CMB 420. Next, the controller 102 (e.g., the watchdog module 112) determines if the storage system 100 has crashed (act 620). Any suitable technique can be used to determine if the storage system 100 crashed/failed. For example, the controller 102 of the storage system 100 can receive an error signal from one or more components in the storage system 100 indicating a failure of that component, or the controller 102 can infer a failure by not receiving expected information in an expected amount of time. Other failure detection techniques can be used. If the storage system 100 has not crashed, the controller 102 continues with its normal operations (act 630). However, if the storage system 100 has crashed, the watchdog module 112 moves the diagnostic data from the CMB 400 to the HMB 410 according to the predetermined data structure (act 640)

Figure 7:
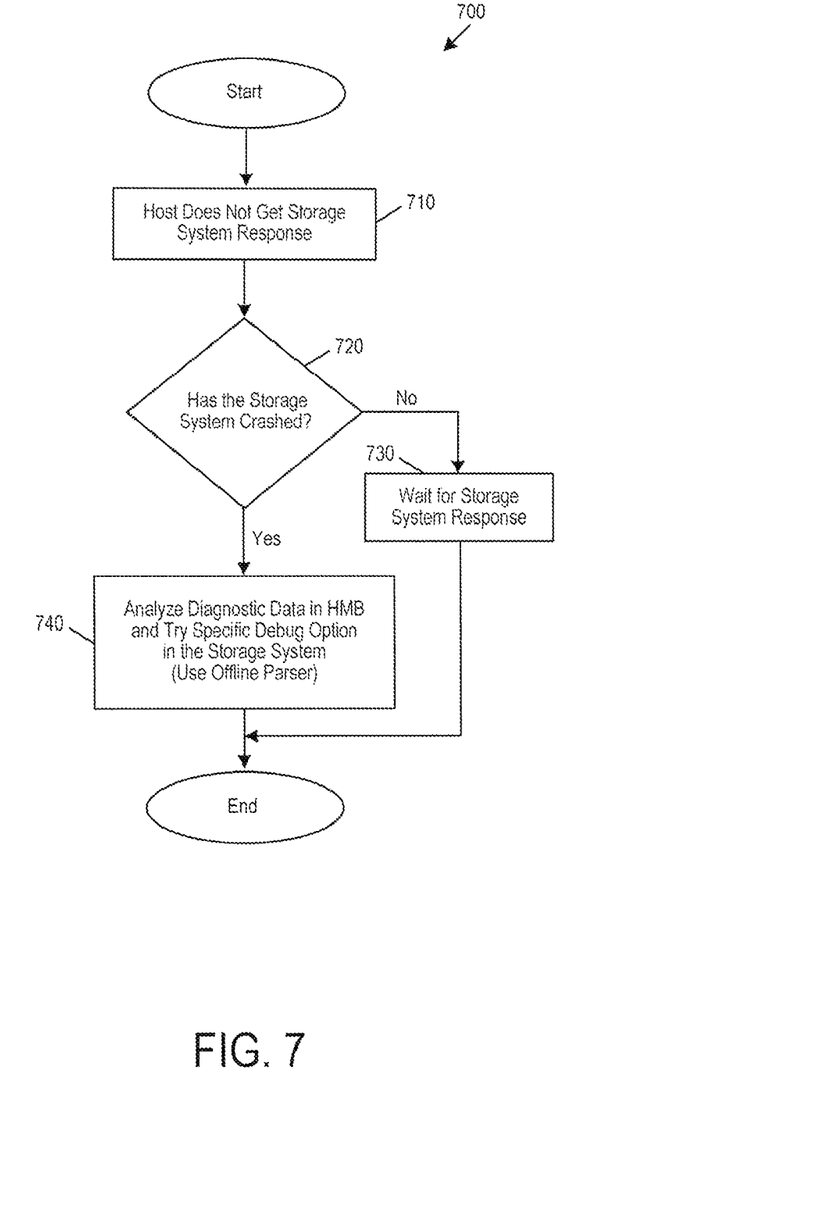
FIG. 7 is a flow chart of a method performed by a host of an embodiment for crash analysis.

FIG. 7 is a flow chart 700 that illustrates operations on the host 300 side. As shown in FIG. 7, when the host 300 does not get a response from the storage system 100 to a command (e.g., a memory read/write command) (act 710), the host 300 determines if the storage system 100 has crashed (act 720). For example, the host 300 can receive an error signal from one or more components in the storage system 100 indicating a failure of that component, or the host 300 can infer a failure. If the host 300 does not detect a failure, it continues to wait for the storage system's response (act 730). However, if the host 300 detects a crash, it can assume that the watchdog module 111 in the storage system 100 sent the crash log to the HMB 410 and will analyze the crash log stored therein to analyze the error (act 740). For example, the host 300 can attempt to trigger certain debug options in the storage system 100 (e.g., using an offline parser). So, unlike with prior storage systems, the host 300 can parse the crash logs without having to depend on access to the memory 104 of the storage system 100. Hence, the storage system 100 does not need to be re-initialized to access the crash log, perform analysis of the diagnostic data, or perform specific debug operations (such as live monitoring some registers (e.g., by attaching a debugger)) that may not have been considered in a generic dump, if even possible, in prior storage systems. Because these embodiments keep the storage system's state machine intact, further probing is possible of controller and memory parameters. To establish memory states, tools can be used to probe failed device registers or even a portion of static RAM (SRAM) in the storage system. This makes identifying a failure simpler by not requiring the device be reinitialized.

The embodiments are usable with the storage systems 100 connected over fabrics as well. The debug data, along with the undisturbed device and memory, can assist faster determination of the root cause of the bug. The method may be desired by original equipment manufacturer (OEM) customers who may have to pass on the debug information generated in their site.

Figure 5:
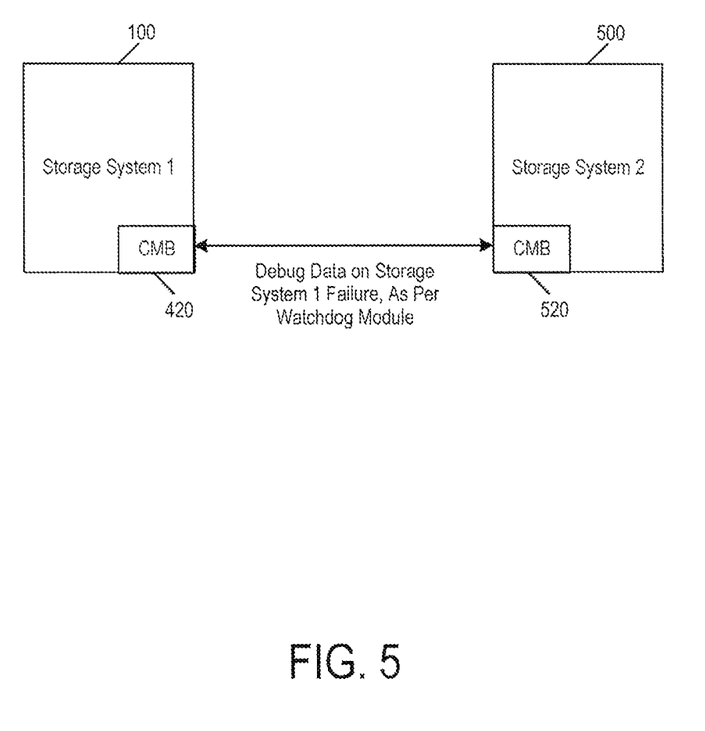
FIG. 5 is a block diagram of two storage systems of an embodiment that can be used for crash analysis.

Further, as mentioned above, instead of sending the crash log to the host 300, the storage system 100 can send the crash log to another device for analysis. This alternative is shown in FIG. 5, wherein the other device is a second storage system 500, and the crash log is stored in the CMB 520 in the second storage system 500. The crash log can be sent to the CMB 520 in the second storage system 500 via a direct memory access (DMA) operation. The functioning of this embodiment is similar to the one discussed above, with a tool/parser running in the second storage system 500 performing necessary analysis to assist in fixing the failure of the first storage system 100. Again, it is not necessary to initialize the failing device, thereby keeping its state machine intact for further probing controller and memory parameters.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
  a memory;
  a controller configured to:
    store a crash log in a buffer in the controller;
    determine whether the storage system has crashed; and
    in response to determining that the storage system has crashed, send the crash log from the buffer in the controller to a host in communication with the storage system for storage; and
  a register configured to store a value needed to analyze diagnostic data in the crash log, wherein re-initialization of the storage system to read the memory after the storage system crashes causes the register to be erased;
  wherein storing the crash log in the host instead of in the memory enables the crash log to be read without re-initializing the storage system and erasing the register.

2. The storage system of claim 1, wherein the crash log is sent to the host for storage in a host memory buffer in the host.

3. The storage system of claim 1, further comprising a host data path configured to route data between the memory and the host, and wherein the crash log is sent from the buffer in the controller to the host outside of the host data path.

4. The storage system of claim 3, wherein the host data path comprises one or more of the following components: an error correction code module, a memory interface module, and a host interface module.

5. The storage system of claim 1, wherein the crash log comprises a pre-determined data structure known to the host and the storage system.

6. The storage system of claim 5, wherein the pre-determined data structure is communicated between the host and the storage system during initialization of the storage system.

7. The storage system of claim 1, wherein a watchdog module in the controller is configured to send the crash log from the buffer in the controller to the host in response to determining that the storage system has crashed.

8. The storage system of claim 1, wherein the memory comprises a three-dimensional memory.

9. The storage system of claim 1, wherein the register is further configured to be read by a parser in the host.

10. The storage system of claim 1, wherein the register is further configured to be read by a debugger in the host.

11. A method comprising:
performing the following in a first storage system in communication with a second storage system, the first storage system comprising a memory:
storing diagnostic data in a controller memory buffer in the first storage system, wherein the first storage system further comprises a register configured to store a value needed to analyze the diagnostic data, wherein re-initialization of the first storage system to read the memory after the first storage system fails causes the register to be erased; and
in response to determining that the first storage system has failed, sending the diagnostic data from the controller memory buffer in the first storage system to the second storage system for storage;
wherein storing the diagnostic data in the second storage system instead of in the memory enables the diagnostic data to be read without re-initializing the first storage system and erasing the register.

12. The method of claim 11, wherein the diagnostic data is sent to the second storage device for storage in a controller memory buffer in the second storage system.

13. The method of claim 11, wherein:
the first storage system further comprises a host data path configured to route data to and from the memory; and
the diagnostic data is sent from the controller memory buffer in the first storage system to the second storage system outside of the host data path.

14. The method of claim 13, wherein the host data path comprises one or more of the following components: an error correction code module, a memory interface module, and a host interface module.

15. The method of claim 11, wherein the diagnostic data comprises a pre-determined data structure known to the first storage system and the second storage system.

16. The method of claim 11, wherein a watchdog module in the first storage system is configured to send the diagnostic data from the controller memory buffer to the second storage system in response to determining that the first storage system has failed.

17. The method of claim 11, wherein the diagnostic data is sent from the controller memory buffer in the first storage system to the second storage system via a direct memory access operation.

18. The method of claim 11, wherein the register is further configured to be read by a parser in the second storage system.

19. The method of claim 11, wherein the register is further configured to be read by a debugger in the second storage system.

20. A storage system comprising:
a memory;
means for storing a crash log in a controller memory buffer in the storage system;
means for, in response to determining that the storage system has crashed, sending the crash log from the controller memory buffer to an external device for storage and analysis; and
a register configured to store a value needed to analyze the crash log, wherein re-initialization of the storage system to read the memory after the storage system crashes causes the register to be erased,
wherein storing the crash log in the external device instead of in the memory enables the crash log to be read without re-initializing the storage system and erasing the register.

* * * * *